(12) United States Patent
Worthington et al.

(10) Patent No.: US 8,699,815 B2
(45) Date of Patent: Apr. 15, 2014

(54) METHODS AND APPARATUS FOR IMPROVED DISPLAY OF FOREGROUND ELEMENTS

(75) Inventors: John W. Worthington, Minnetonka, MN (US); Jerry G. Harris, Newberry, FL (US)

(73) Assignee: Adobe Systems Incorporated, San Jose, CA (US)

( * ) Notice: Subject to any disclaimer, the term of this patent is extended or adjusted under 35 U.S.C. 154(b) by 391 days.

(21) Appl. No.: 13/149,601

(22) Filed: May 31, 2011

(65) Prior Publication Data

US 2013/0129206 A1 May 23, 2013

(51) Int. Cl.
G06K 9/40 (2006.01)
(52) U.S. Cl.
USPC ........... 382/274; 382/167; 382/307; 382/171; 382/172; 382/282; 382/260; 382/261; 382/262; 382/263; 382/264; 382/265; 382/266
(58) Field of Classification Search
USPC ................. 382/167, 274, 307, 172, 171, 282, 382/260–266
See application file for complete search history.

(56) References Cited

U.S. PATENT DOCUMENTS

| | | | |
|---|---|---|---|
| 6,016,137 A | 1/2000 | Evans et al. | |
| 6,337,701 B1 | 1/2002 | Jones | |
| 6,731,800 B1 * | 5/2004 | Barthel et al. | 382/176 |
| 6,977,664 B1 * | 12/2005 | Jinzenji et al. | 345/629 |
| 7,129,959 B2 | 10/2006 | Someya et al. | |
| 7,298,383 B2 | 11/2007 | Vuylsteke | |
| 7,586,481 B1 | 9/2009 | Paquette et al. | |
| 7,770,126 B2 | 8/2010 | Townsend et al. | |
| 7,801,330 B2 * | 9/2010 | Zhang et al. | 382/103 |
| 8,311,329 B2 * | 11/2012 | Meyer et al. | 382/172 |
| 2002/0063740 A1 | 5/2002 | Florenza et al. | |
| 2003/0038832 A1 * | 2/2003 | Sobol | 345/722 |
| 2003/0123729 A1 * | 7/2003 | Mukherjee et al. | 382/176 |
| 2003/0202697 A1 * | 10/2003 | Simard et al. | 382/195 |
| 2004/0032906 A1 * | 2/2004 | Lillig | 375/240.08 |
| 2008/0143739 A1 * | 6/2008 | Harris et al. | 345/604 |
| 2010/0189375 A1 | 7/2010 | Bertens et al. | |

* cited by examiner

Primary Examiner — Jayesh A Patel
(74) Attorney, Agent, or Firm — Wolfe-SBMC

(57) ABSTRACT

A set of pixels of a background element is identified according to a mask that defines a shape of a foreground element. A color value for a pixel of the foreground element is determined. The determining includes ascertaining a value of a measure of brightness of one or more pixels of a set of pixels of the background element and calculating the color value for the pixel of the foreground element based on the value of the measure of brightness and a value of an adjustable contrast variable. The calculating the color value for the pixel of the foreground element preserves in the foreground element a color component of the one or more pixels of the set of pixels of the background element and increases contrast with the value of the measure of brightness according to the value of the adjustable contrast variable.

16 Claims, 13 Drawing Sheets

Calculate the color value for the pixel of the foreground element to preserve in the foreground element a color component of the one or more pixels of the set of pixels of the background element to which the pixel of the foreground element is correlated
550

Calculate the color value for the pixel of the foreground element to increase contrast with the value of the measure of brightness according to the value of the adjustable contrast variable
560

*FIG. 5B*

| Non-neighboring pixel 720a | Non-neighboring pixel 720b | Non-neighboring pixel 720c | Non-neighboring pixel 720d | Non-neighboring pixel 720e |
|---|---|---|---|---|
| Non-neighboring pixel 720p | Neighboring pixel 710a | Neighboring pixel 710b | Neighboring pixel 710c | Non-neighboring pixel 720f |
| Non-neighboring pixel 720o | Neighboring pixel 710d | Pixel of interest 700 | Neighboring pixel 710e | Non-neighboring pixel 720g |
| Non-neighboring pixel 720n | Neighboring pixel 710f | Neighboring pixel 710g | Neighboring pixel 710h | Non-neighboring pixel 720h |
| Non-neighboring pixel 720m | Non-neighboring pixel 720l | Non-neighboring pixel 720k | Non-neighboring pixel 720j | Non-neighboring pixel 720i |

*FIG. 7*

METHODS AND APPARATUS FOR IMPROVED DISPLAY OF FOREGROUND ELEMENTS

BACKGROUND

Description of the Related Art

Traditionally, dynamic foreground image elements, such as cursors or user-defined bounding lines, are drawn using an XOR drawing mode that allows the same drawing function to both draw and erase the foreground image. XOR is a bitwise logical operation on two operands that results in a logical value of true if and only if one of the operands, but not both, has a value of true. The XOR operation is performed over each bit in the operands. Performing the same XOR operation on the same operands twice results in the original operands. Thus, when a cursor is drawn using an XOR mode, that cursor may be erased by drawing the same cursor again in the same location. When drawing foreground images using XOR, a foreground image is typically drawn into the frame buffer and therefore changes the actual background image accordingly. Thus, the background image must be restored whenever the foreground image is to be erased. However, XOR-based cursor drawing frequently causes color shifts that may interfere with the overall look of the image and that may also cause a user difficulty when working with an image, such as in a graphics or image drawing application.

Additionally, one alternative to XOR-based cursors is a fixed-color cursor with a static visibility-enhanced edge, generally a static double edge, one black and one white, so that the edge of the cursor is visible over varying background colors. However, using such a double edge may increase the amount of the background image that is being covered by the foreground image element.

SUMMARY

Various embodiments of methods and apparatus for improved display of foreground elements are disclosed. A set of pixels of a background element is identified according to a mask that defines a shape of a foreground element. A color value for a pixel of the foreground element is determined. The determining includes ascertaining a value of a measure of brightness of one or more pixels of a set of pixels of the background element and calculating the color value for the pixel of the foreground element based on the value of the measure of brightness and a value of an adjustable contrast variable. The calculating the color value for the pixel of the foreground element preserves in the foreground element a color component of the one or more pixels of the set of pixels of the background element and increases contrast with the value of the measure of brightness according to the value of the adjustable contrast variable.

BRIEF DESCRIPTION OF THE DRAWINGS

FIGS. 5A-5B illustrate high-level logical flowcharts of a process for improved display of foreground objects according to some embodiments.

FIG. 7 illustrates a pixel group for use with a process for improved display of foreground objects according to some embodiments.

Figure 1A:
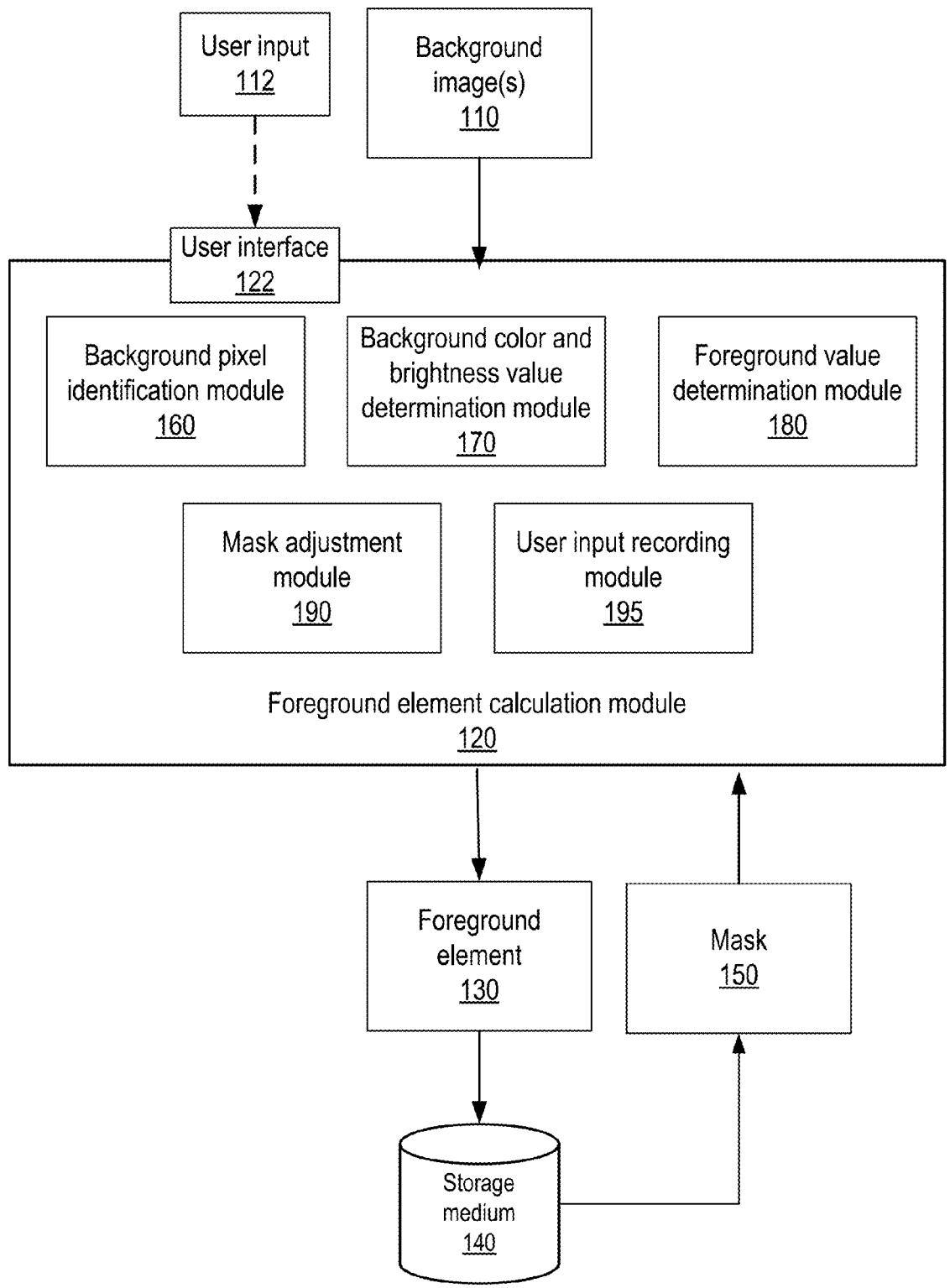
FIG. 1A illustrates a module that may implement improved display of foreground objects according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Improved Display of Foreground Objects

Various embodiments of methods and apparatus for improved display of foreground objects are presented. In some embodiments, a foreground object is a cursor or other pointing or selecting icon that is displayed with a background image in a graphical user interface comprising windows, icons, mice and pointers. In other embodiments, examples of a foreground object may include subtitles displayed in a screen with a video.

As used herein, cursors and other foreground images may be drawn to a separate compositing or layered window, according to some embodiments. Display of images is frequently defined using layers. Layers are independent images that can be manipulated as if each layer were an independent image. Each layer only forms a part of the final image. Layers may be conceptualized in a manner similar to transparencies stacked one on top of one another. Each layer may have different objects, images and effects. Layers allow a system to process separate images in order to modify sections without changing the entire image. In some embodiments, when the layers are stacked, the images appear as if they are all a single image. In some embodiments, the final image is made up from all of the layers within the image, with the value of a pixel displayed depending on the order of the layers.

In some embodiments, when drawing to a separate compositing or layered window, the actual pixel information of a background image in a frame buffer is not actually modified to display the foreground image. Instead, a compositing mechanism provided by a graphics system, graphics processing unit (GPU), or operating system may be used to composite the foreground image in the layered window with the background image for on-screen display without actually modifying the underlying background pixel information. For example, when using a separate compositing or layered window to draw and update an onscreen cursor, the graphic application may dynamically calculate the contents of the window for each new location at which the cursor should be drawn.

Please note that the term "foreground image", as used herein, may refer to virtually any sort of image element being dynamically displayed over a background image, as described herein. For example, in one embodiment, the foreground image may be a cursor moved by a mouse or other input device. In other embodiments, a foreground image may represent a set of lines, curves or other geometric primitives. For example, a graphics program may allow a user to select a particular region of an image by specifying a bounding line (e.g., such as with a rubber-banding, or "lasso" tool) around the region. In yet other embodiments, the foreground image may represent text being displayed over a background image, such as extra information for a user. In general, the methods described herein may be used with virtually any graphic information as a foreground image.

In one embodiment, a process as described below is used for preparing for display of a foreground image, also called a foreground element, and a background image, also called a background element. Systems for preparing the foreground element for display are discussed below with respect to FIG. 1A. Operations for preparing and displaying the foreground element and the background element are discussed below with respect to FIGS. 5A-8. Results of such operations are discussed below with respect to FIGS. 2-4.

In some embodiments, a mask may be used to define a shape of the foreground element. Based on an expected position of the foreground element, a set of pixels of a background element is identified according to the mask, where each of the set pixels of the background element occupies a position also occupied by an expected position of a pixel of the foreground element according to the mask.

A color value for a pixel of the foreground element is determined by ascertaining a value of a measure of brightness of one or more pixels of the set of pixels of the background element to which the pixel of the foreground element is correlated and calculating the color value for the pixel of the foreground element based on the value of the measure of brightness and a value of an adjustable contrast variable. In some embodiments, only a pixel of the background element occupying a same position as a respective pixel of the foreground element is correlated to the pixel of the foreground element. In other embodiments, each of a larger set of pixels of the background element occupying a neighborhood (neighboring pixels) around a position of a respective pixel of the foreground element is correlated to the pixel of the foreground element. In some embodiments, an aggregate color value of the plurality of pixels of the set of pixels of the background element is calculated and the calculating the color value for the pixel of the foreground element based on the value of a measure of brightness and the value of the adjustable contrast variable further includes calculating the color value for the pixel of the foreground element based on the aggregate color value.

Calculating the color value for the pixel of the foreground element may be accomplished according to a variety of calculational systems, examples of which are provided below. In some embodiments, the color value for the pixel of the foreground element is calculated to preserve in the foreground element a color component of the one or more pixels of the set of pixels of the background element to which the pixel of the foreground element is correlated. Such a color component that is preserved is, in some embodiments, the hue or chroma of the pixel. Likewise, in some embodiments, the color value for the pixel of the foreground element is calculated to increase contrast with the value of the measure of brightness according to the value of the adjustable contrast variable. Such calculations to increase contrast and preserve a color component may be performed in a single calculation or as a set of calculational steps, which will vary between embodiments. In some embodiments, calculations are performed with respect to individual pixels of the background image, while other embodiments perform calculations with respect to aggregations of pixels of the background image.

Likewise, in some embodiments, the calculating the color value for the pixel of the foreground element includes calculating the color value for the pixel of the foreground element to correspond to one or more respective color values of one or more neighboring pixels of the foreground element.

In some embodiments, foreground element may then be displayed in a layer overlaying the background element, with the pixel of the foreground element having the color value calculated as described above. In some embodiments, a dimension of the mask is additionally modified in response to a display resolution. In some embodiments, the display resolution is a resolution of a physical device, such as a screen, that is used to display the foreground element and the background element. In other embodiments, the display resolution is a resolution of the background element.

Some embodiments include a foreground element contrast control interface for receiving the value of the adjustable contrast variable according to some embodiments. Such a foreground element contrast control interface for receiving the value of the adjustable contrast variable according to some embodiments is discussed below with respect to FIG. 1B.

Some embodiments simultaneously display a foreground element and a background element using a foreground element calculation module, as discussed below with respect to FIG. 1A. A foreground element calculation module may receive input identifying a desired level of contrast between a foreground element and a background element and may render the foreground element in colors selected to increase the contrast between the foreground element and the background element while preserving in the foreground element a particular color component of the background element, as described herein. The foreground element calculation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying value of an adjustable contrast variable representing a desired contrast between the foreground element and background element, as described herein. Other embodiments of the foreground element calculation module may be at least partially implemented by hardware circuitry and/or firmware stored, for example, in a non-volatile memory.

FIG. 1A illustrates a foreground element calculation module that may implement one or more of the foreground element calculation techniques and tools illustrated in FIGS. 1A through 8. Foreground element calculation module 120 may, for example, implement one or more of a user input recording tool with respect to receiving input identifying value of an adjustable contrast variable and a foreground element calculation and rendering tool. FIG. 9 illustrates an example computer system on which embodiments of foreground element calculation module 120 may be implemented.

Foreground element calculation module 120 receives as input background elements in the form of one or more background images 110. Example background elements, labeled simply as "image" are shown in each of FIGS. 2-4. Foreground element calculation module 120 may receive user input 112 activating a display of a foreground element and/or indicating a location for display of a foreground element. Foreground element calculation module 120 then combines background image(s) 110 and a mask 150 to generate a foreground element 130, according to user input 112 received via user interface 122, which may activate display of a foreground element, indicate a location of a foreground element, and or indicate a desired contrast value for the foreground element.

The user may activate display of a different foreground element or change a display of a position of a foreground element, resulting editing of the foreground element 130, and/or may activate other tools and further edit foreground element 130. Module 120 generates as output one or more foreground elements 130. Foreground element(s) 130 may, for example, be stored to a storage medium 140, such as system memory, a disk drive, DVD, CD, etc.

In some embodiments, foreground element calculation module 120 may provide a user interface 122, such as that described below with respect to FIG. 1B, via which a user may interact with the module 120, activate display of a foreground element, indicate a location of a foreground element, and or indicate a desired contrast value for the foreground element. In some embodiments, the user interface may provide user interface elements whereby the user may select options including, but not limited to, the blending mode, opacity, and/or flow of a foreground element, in addition to contrast.

Foreground element calculation module 120 may interact with a graphics application (not shown) that may represent various types of graphics applications, such as painting, publishing, photography, games, animation, and other applications. Additionally, a graphics application may utilize a graphics processor when rendering or displaying foreground images onto background images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor may implement a number of graphics primitive operations in a way that makes executing them must faster than drawing directly to the screen with a host central processing unit (CPU). Please note that functionality and/or features described herein as being part of, or performed by, a graphics application may, in some embodiments, be part of, or performed by, one or more graphics processors. As described above, in some embodiments a graphics application may be configured to render foreground images into a separate image layer or separate layered window.

In one embodiment, a background pixel identification module 160 is used for identifying a set of pixels of a background image 110 according to mask 150. Mask 150 defines a shape of foreground element 130.

A background color and brightness determination module 170 is used for ascertaining a value of a measure of brightness of one or more pixels of the set of pixels of the background element to which the pixel of the foreground element is correlated. Additionally, in some embodiments, background color and brightness determination module 170 is used for ascertaining a color component of the one or more pixels of the set of pixels of the background element to which the pixel of the foreground element is correlated.

A foreground value determination module 180 is used for calculating the color value for the pixel of the foreground element based on the value of the measure of brightness and a value of an adjustable contrast variable. In some embodiments calculating the color value for the pixel of the foreground element further includes calculating the color value for the pixel of the foreground element to preserve in the foreground element a color component of the one or more pixels of the set of pixels of the background element to which the pixel of the foreground element is correlated, and calculating the color value for the pixel of the foreground element to increase contrast with the value of the measure of brightness according to the value of the adjustable contrast variable.

A mask adjustment module 190 is used for adjusting a dimension of the mask 150 is additionally modified in response to a display resolution. In some embodiments, the display resolution is a resolution of a physical device, such as a screen, that is used to display the foreground element and the background element. In other embodiments, the display resolution is a resolution of the background element.

A user input recording module 195 is used for recording input from user interface 122 indicating a value of an adjustable contrast variable, such as is discussed below with respect to FIG. 1B.

Figure 1B:
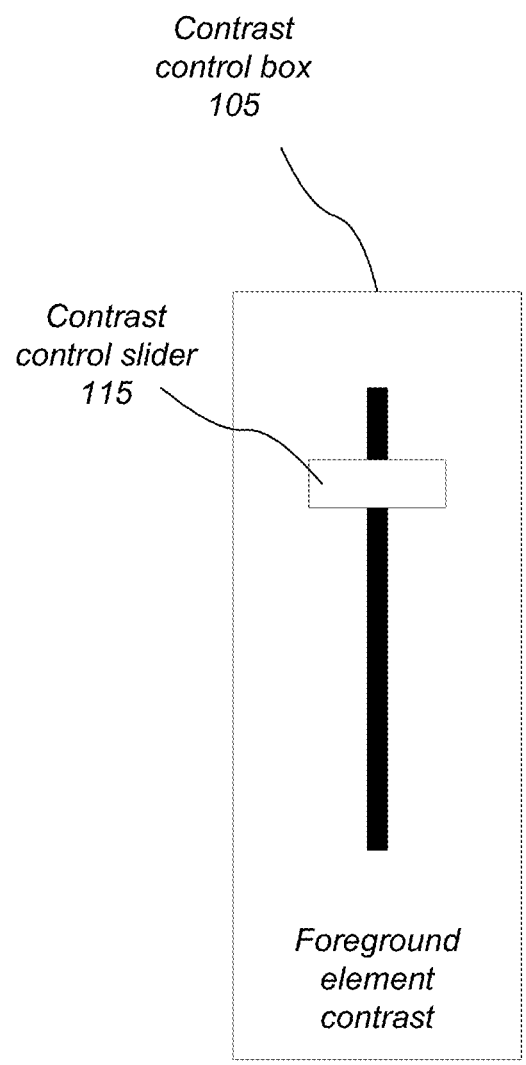
FIG. 1B illustrates a foreground element contrast control interface for receiving the value of the adjustable contrast variable according to some embodiments.

FIG. 1B illustrates a foreground element contrast control interface for receiving the value of the adjustable contrast variable according to some embodiments. In one embodiment, a contrast control box 105 containing a contrast control slider 115 is presented to a user. The user is able to manipulate contrast control slider 115 to indicate a value of an adjustable contrast variable. In some embodiments, contrast control box 105 simultaneously with a foreground element, and calculating the color values for the pixels of the foreground element based on the value of the measure of brightness and an updated value of an adjustable contrast variable the foreground element is performed in response to an adjustment of contrast control slider 115. With updated values calculated, the foreground element is displayed, such that a user can see in real time the changes to the foreground element resulting from an adjustment of contrast control slider 115.

Examples of Improved Display of Foreground Objects

Figure 2A:
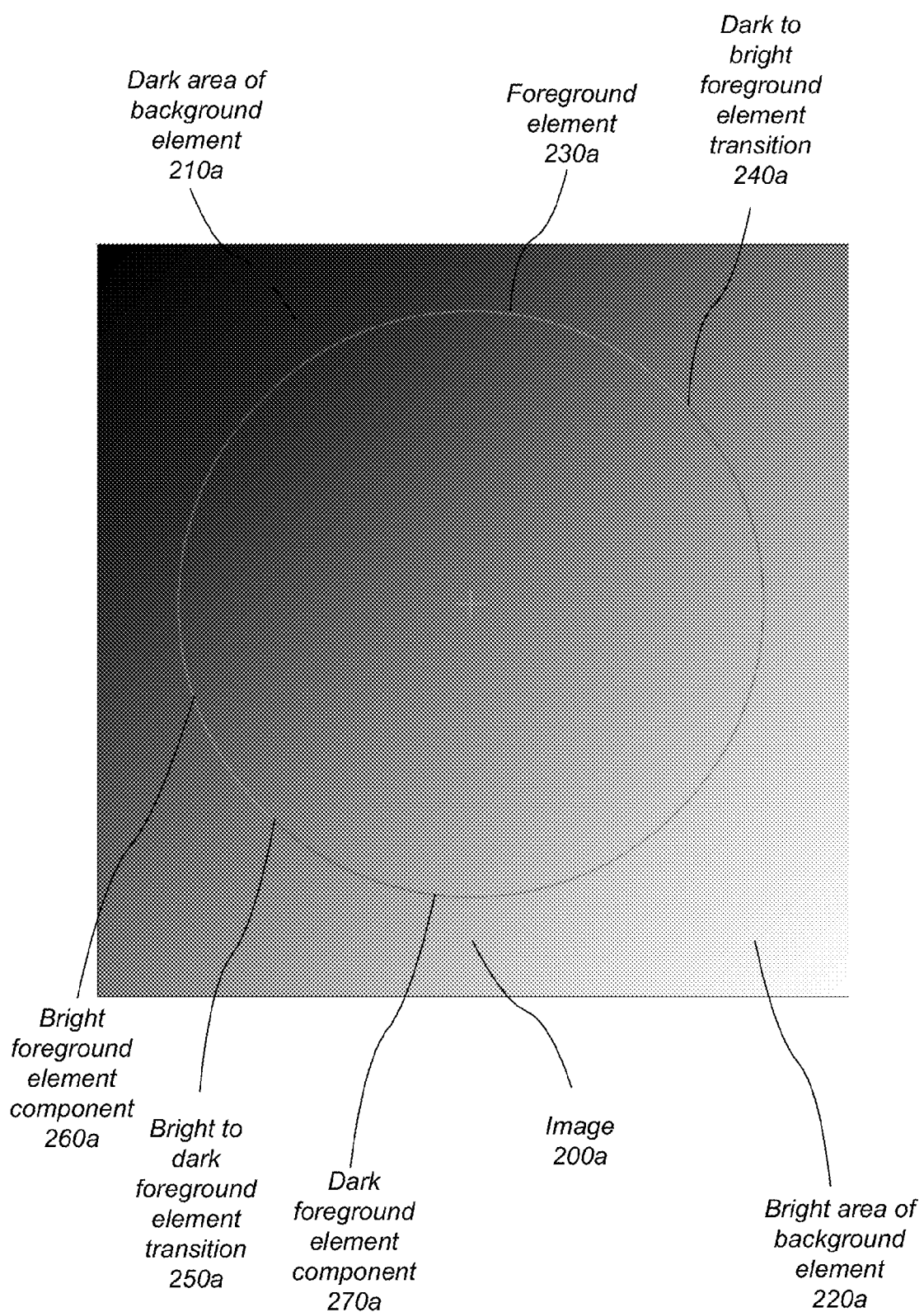
FIG. 2A depicts a foreground element shown in front of a background element using a method for improved display of foreground objects according to an embodiment.

FIG. 2A depicts a foreground element shown in front of a background element using a method for improved display of foreground objects according to an embodiment. A background element, labeled as image 200a is displayed with a foreground element 230a, which, in one embodiment, is a selection cursor. Image 200a includes a dark area of background element 210a and a bright area of background element 220a, and foreground element 230a extends into both dark area of background element 210a and bright area of background element 220a. As can be seen, in areas in which foreground element 230a is displayed with bright area of background element 220a, foreground element 230a is presented as dark foreground element component 270a. Likewise, in areas in which foreground element 230a is displayed with dark area of background element 210a, foreground element 230a is presented as bright foreground element component 260a. A bright to dark foreground element transition 250a and a dark to bright foreground element transition 240a separate dark foreground element component 270a from bright foreground element component 260a.

In the embodiment shown in FIG. 2A, the shape of a set of pixels of image 200a is identified according to a mask for defining the shape of foreground element 230a. The color values of pixels of foreground element 230a are determined by ascertaining measures of brightness for one or more pixels of image 200a that are correlated to a given pixel of foreground element 230a. In some embodiments, such correlated pixels of image 200a occupy a same screen location in image 200a as respective pixels of foreground element 230a. In other embodiments, such correlated pixels of image 200a occupy a neighborhood around a same screen location in image 200a as respective pixels of foreground element 230a.

A color value is calculated for each pixel of foreground element 230a, based on the measure of brightness and the value of an adjustable contrast variable. The color value is calculated to preserve in foreground element 230a a color component of the one or more pixels of the set of pixels of image 200a to which the pixel of foreground element 230a is correlated while simultaneously increasing contrast with the value of the measure of brightness according to the adjustable contrast variable.

Figure 2B:
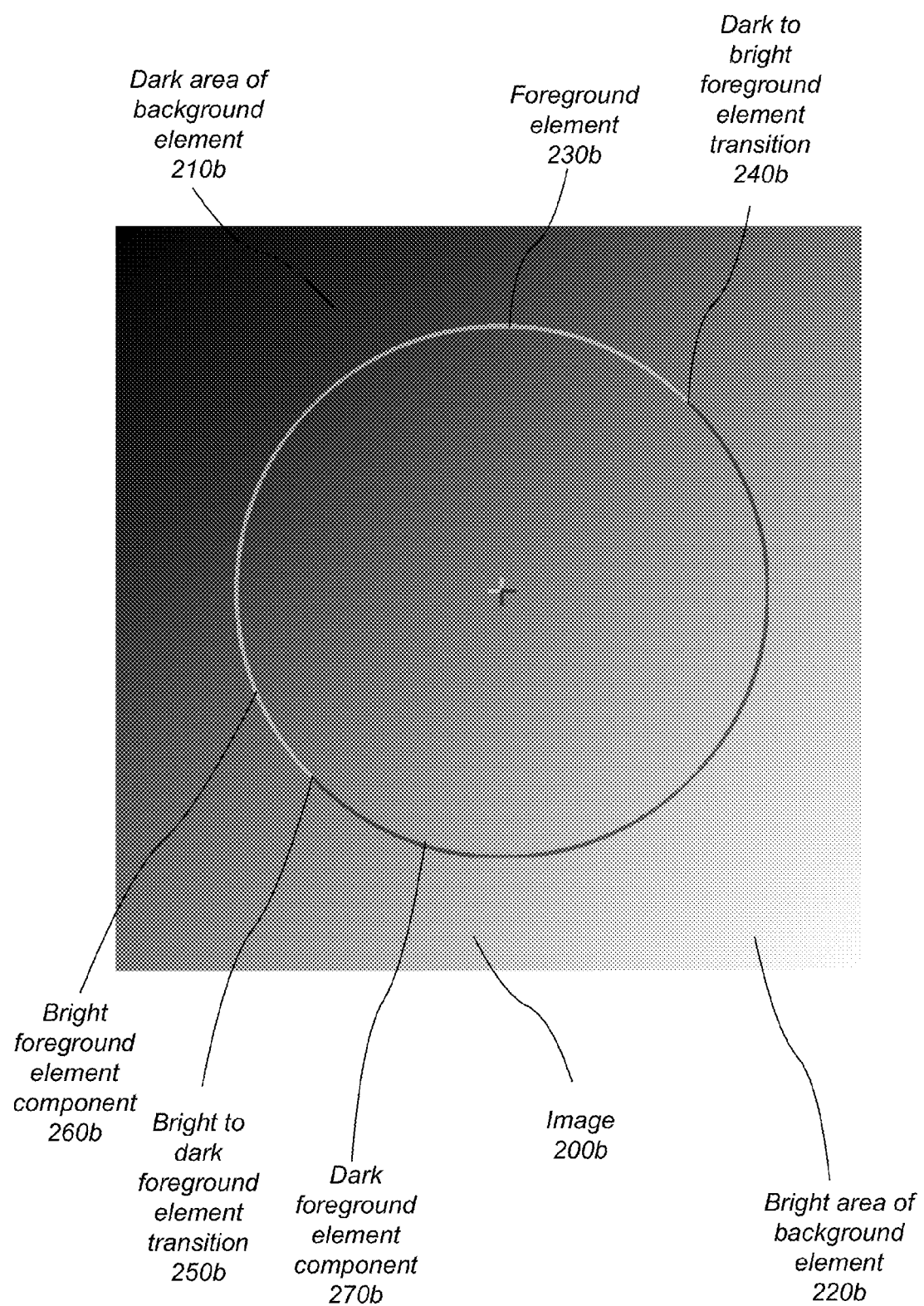
FIG. 2B depicts a foreground element, thickened to provide enhanced visibility in response to higher-resolution values, shown in front of a background element using a method for improved display of foreground objects according to an embodiment.

FIG. 2B depicts a foreground element, thickened to provide enhanced visibility in response to higher-resolution values, shown in front of a background element using a method for improved display of foreground objects according to an embodiment. A background element, labeled as image 200b is displayed with a foreground element 230b, which, in one embodiment, is a selection cursor. Image 200b includes a dark area of background element 210b and a bright area of background element 220b, and foreground element 230b extends into both dark area of background element 210b and bright area of background element 220b. As can be seen, in areas in which foreground element 230b is displayed with bright area of background element 220b, foreground element 230b is presented as dark foreground element component 270b. Likewise, in areas in which foreground element 230b is displayed with dark area of background element 210b, foreground element 230b is presented as bright foreground element component 260b. A bright to dark foreground element transition 250b and a dark to bright foreground element transition 240b separate dark foreground element component 270b from bright foreground element component 260b.

In the embodiment shown in FIG. 2B, the shape of a set of pixels of image 200b is identified according to a mask for defining the shape of foreground element 230b. With brief reference to FIG. 2A and FIG. 2B, in the embodiment shown in FIG. 2B, foreground element 230b of FIG. 2B appears "thicker" than foreground element 230a of FIG. 2A. The difference in thickness of foreground element 230b of FIG. 2B and foreground element 230a of FIG. 2A reflect the ability of some embodiments to adjust a dimension of the mask based on a resolution value. Thus, in the embodiment shown in FIG. 2B, the dimension of the mask that is adjusted is a width of foreground element 230b of FIG. 2A, which is twice width of foreground element 230a of FIG. 2A. In some embodiments, such a mask dimension adjustment is performed in response to a resolution value representing a resolution of a screen device displaying the background element. In some embodiments, such a mask dimension adjustment is performed in response to a resolution value representing a resolution of the background element.

The color values of pixels of foreground element 230b are determined by ascertaining measures of brightness for one or more pixels of image 200b that are correlated to a given pixel of foreground element 230b. In some embodiments, such correlated pixels of image 200b occupy a same screen location in image 200b as respective pixels of foreground element 230b. In other embodiments, such correlated pixels of image 200b occupy a neighborhood around a same screen location in image 200a as respective pixels of foreground element 230b.

A color value is calculated for each pixel of foreground element 230b, based on the measure of brightness and the value of an adjustable contrast variable. The color value is calculated to preserve in foreground element 230b a color component of the one or more pixels of the set of pixels of image 200b to which the pixel of foreground element 230b is correlated while simultaneously increasing contrast with the value of the measure of brightness according to the adjustable contrast variable.

Figure 3:
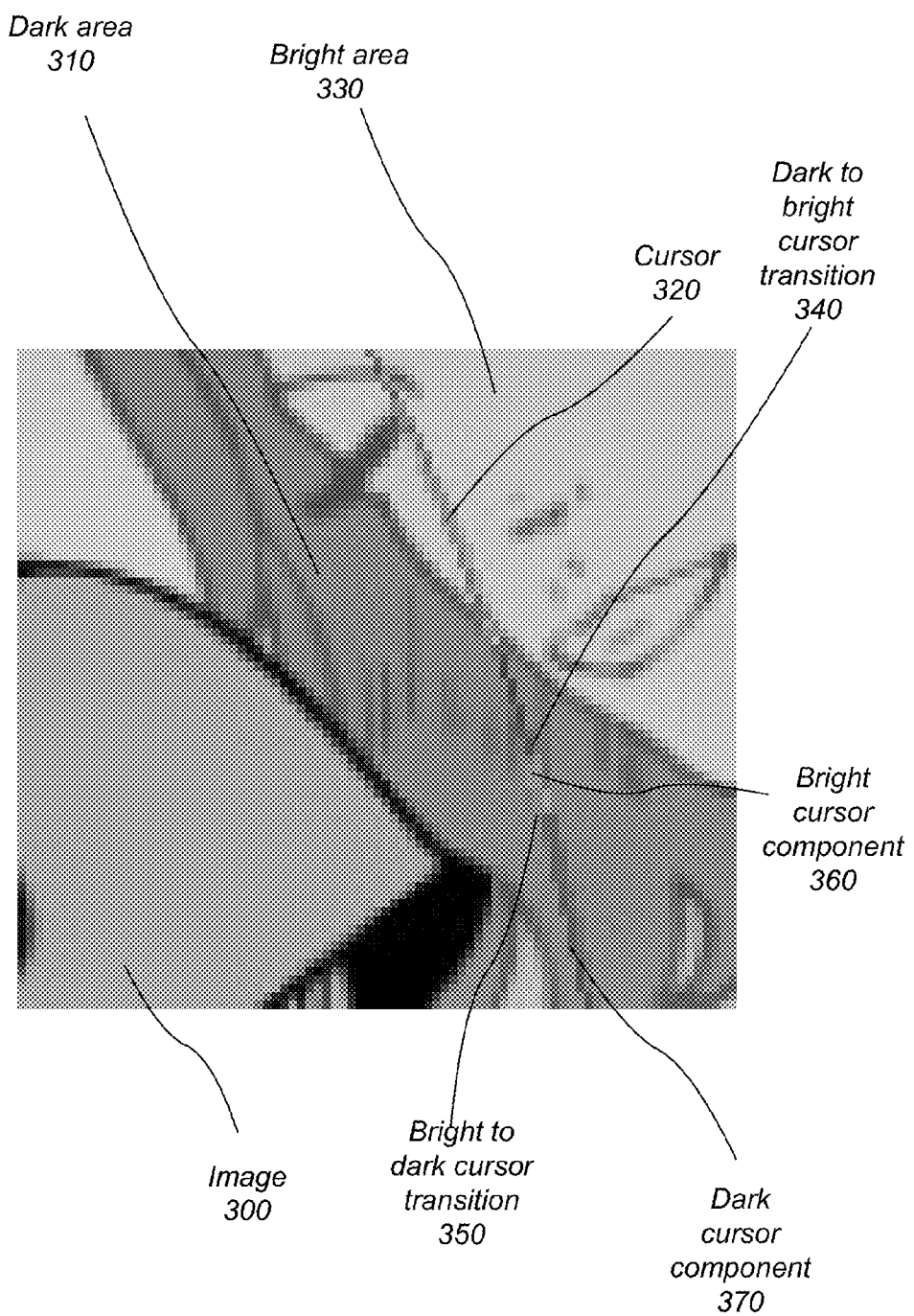
FIG. 3 illustrates a cursor shown in front of a background image using a method for improved display of foreground objects according to an embodiment.

FIG. 3 illustrates a cursor shown in front of a background image using a method for improved display of foreground objects according to an embodiment. A background element, labeled as image 300 is displayed with a cursor 320. Image 300 includes a dark area 310 and a bright area 330, and cursor 320 extends into both dark area 210 and bright area 330. As can be seen, in areas in which cursor 320 is displayed with bright area 330, cursor 320 is presented as dark cursor component 370. Likewise, in areas in which cursor 320 is displayed with dark area 310, cursor 320 is presented as bright cursor component 360. A bright to dark cursor transition 350 and a dark to bright cursor transition 340 separate dark cursor component 370 from bright cursor component 360.

In the embodiment shown in FIG. 3, the shape of a set of pixels of image 300 is identified according to a mask for defining the shape of cursor 320. The color values of pixels of cursor 320 are determined by ascertaining measures of brightness for one or more pixels of image 300 that are correlated to a given pixel of cursor 320. In some embodiments, such correlated pixels of image 300 occupy a same screen location in image 300 as respective pixels of cursor 320. In other embodiments, such correlated pixels of image 300 occupy a neighborhood around a same screen location in image 300 as respective pixels of cursor 320.

A color value is calculated for each pixel of cursor 320, based on the measure of brightness and the value of an adjustable contrast variable. The color value is calculated to preserve in cursor 320 a color component of the one or more pixels of the set of pixels of image 300 to which the pixel of foreground element 320 is correlated while simultaneously increasing contrast with the value of the measure of brightness according to the adjustable contrast variable.

Figure 4:
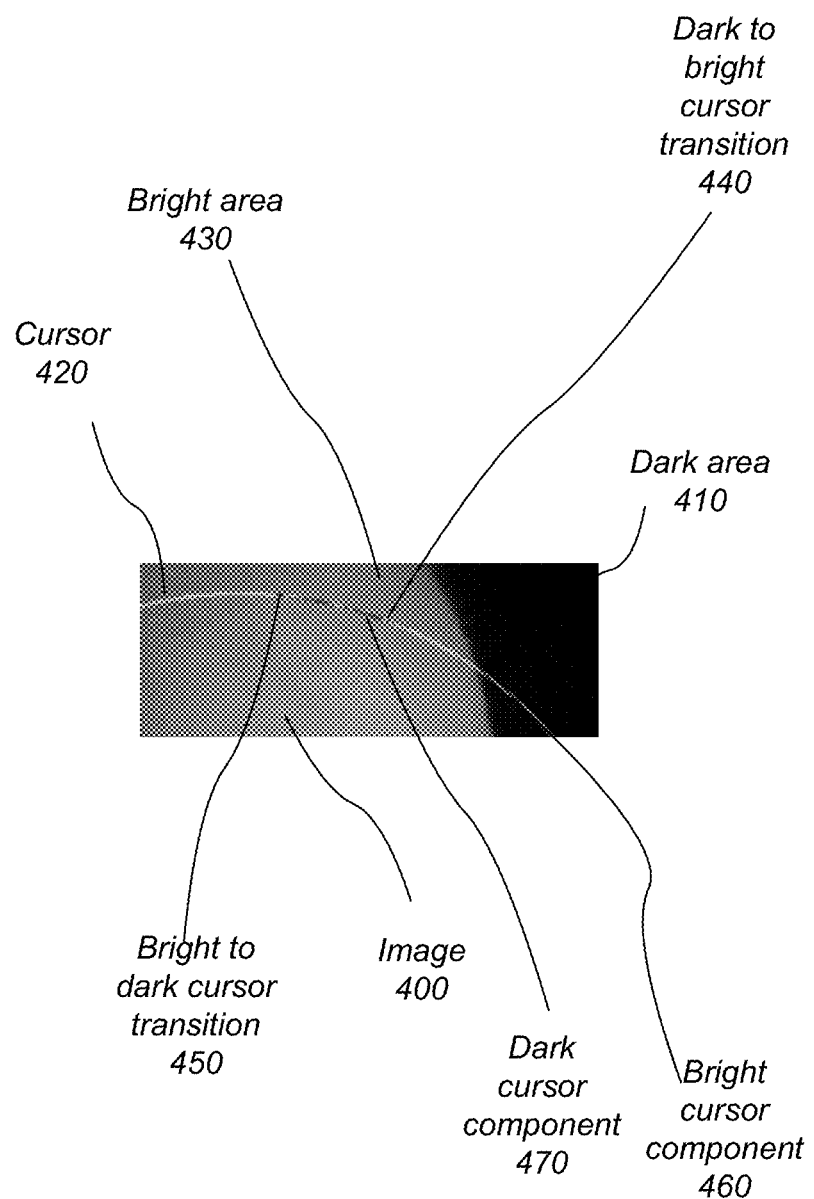
FIG. 4 depicts a cursor shown in front of a background image using a method for improved display of foreground objects according to an embodiment.

FIG. 4 depicts a cursor shown in front of a background image using a method for improved display of foreground objects according to an embodiment. A background element, labeled as image 400 is displayed with a cursor 420. Image 400 includes a dark area 410 and a bright area 430, and cursor 420 extends into both dark area 410 and bright area 430. As can be seen, in areas in which cursor 420 is displayed with bright area 430, cursor 420 is presented as dark cursor component 470. Likewise, in areas in which cursor 420 is displayed with dark area 410, cursor 420 is presented as bright cursor component 460. A bright to dark cursor transition 450 and a dark to bright cursor transition 440 separate dark cursor component 470 from bright cursor component 460.

In the embodiment shown in FIG. 4, the shape of a set of pixels of image 400 is identified according to a mask for defining the shape of cursor 420. The color values of pixels of cursor 420 are determined by ascertaining measures of brightness for one or more pixels of image 400 that are correlated to a given pixel of cursor 420. In some embodiments, such correlated pixels of image 400 occupy a same screen location in image 400 as respective pixels of cursor 420. In other embodiments, such correlated pixels of image 400 occupy a neighborhood around a same screen location in image 400 as respective pixels of cursor 420.

A color value is calculated for each pixel of cursor 420, based on the measure of brightness and the value of an adjustable contrast variable. The color value is calculated to preserve in cursor 420 a color component of the one or more pixels of the set of pixels of image 400 to which the pixel of foreground element 420 is correlated while simultaneously increasing contrast with the value of the measure of brightness according to the adjustable contrast variable.

Processes for Improved Display of Foreground Objects

Figure 5A:
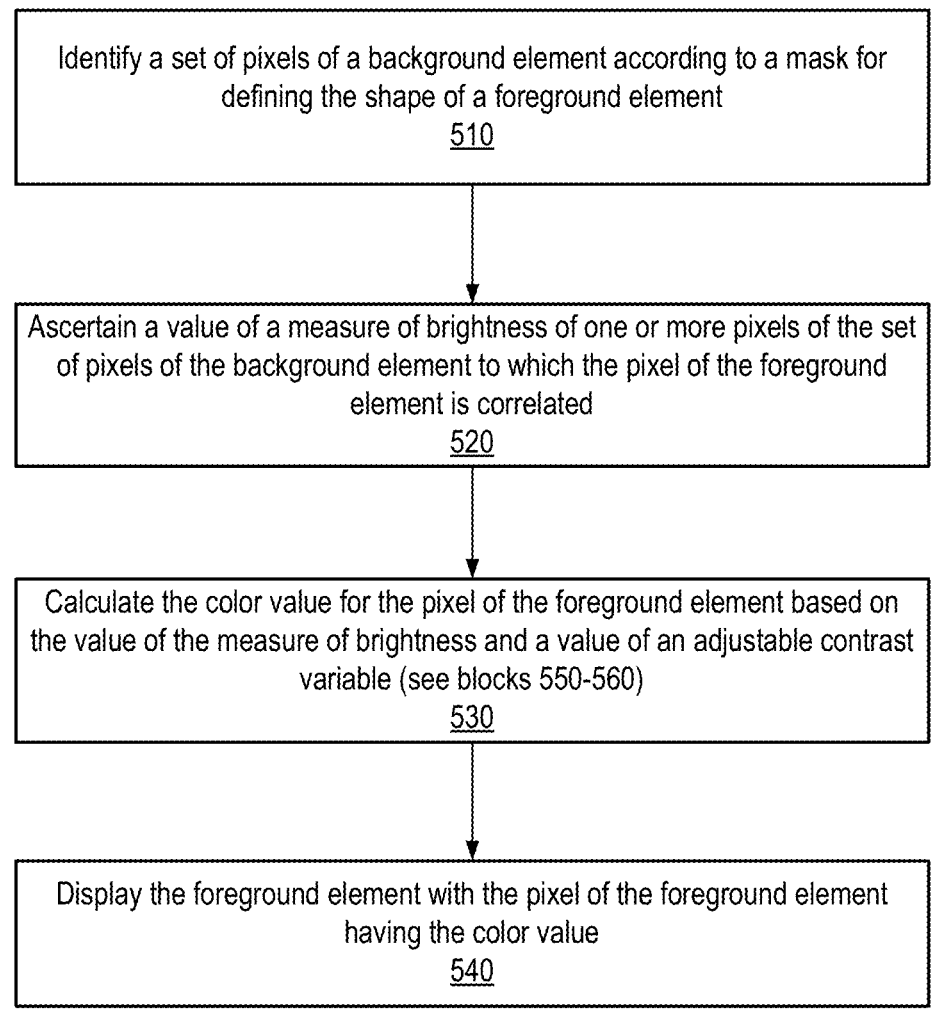

FIGS. 5A-5B illustrate high-level logical flowcharts of a process for improved display of foreground objects according to some embodiments. FIG. 5A depicts an overall process for display of foreground objects in blocks 510-540, while FIG. 5B illustrates detail of block 530. A set of pixels of a background element according to a mask for defining the shape of a foreground element is identified (block 510). A value of a measure of brightness of one or more pixels of the set of pixels of the background element to which the pixel of the foreground element is correlated is ascertained (block 520). The color value for the pixel of the foreground element based on the value of the measure of brightness and a value of an adjustable contrast variable is calculated (block 530). The foreground element is displayed with the pixel of the foreground element having the color value (block 540).

Turning now to FIG. 5B, the color value for the pixel of the foreground element to preserve in the foreground element a color component of the one or more pixels of the set of pixels of the background element to which the pixel of the foreground element is correlated is calculated (block 550). The color value for the pixel of the foreground element to increase contrast with the value of the measure of brightness according to the value of the adjustable contrast variable is calculated (block 560).

Figure 6A:
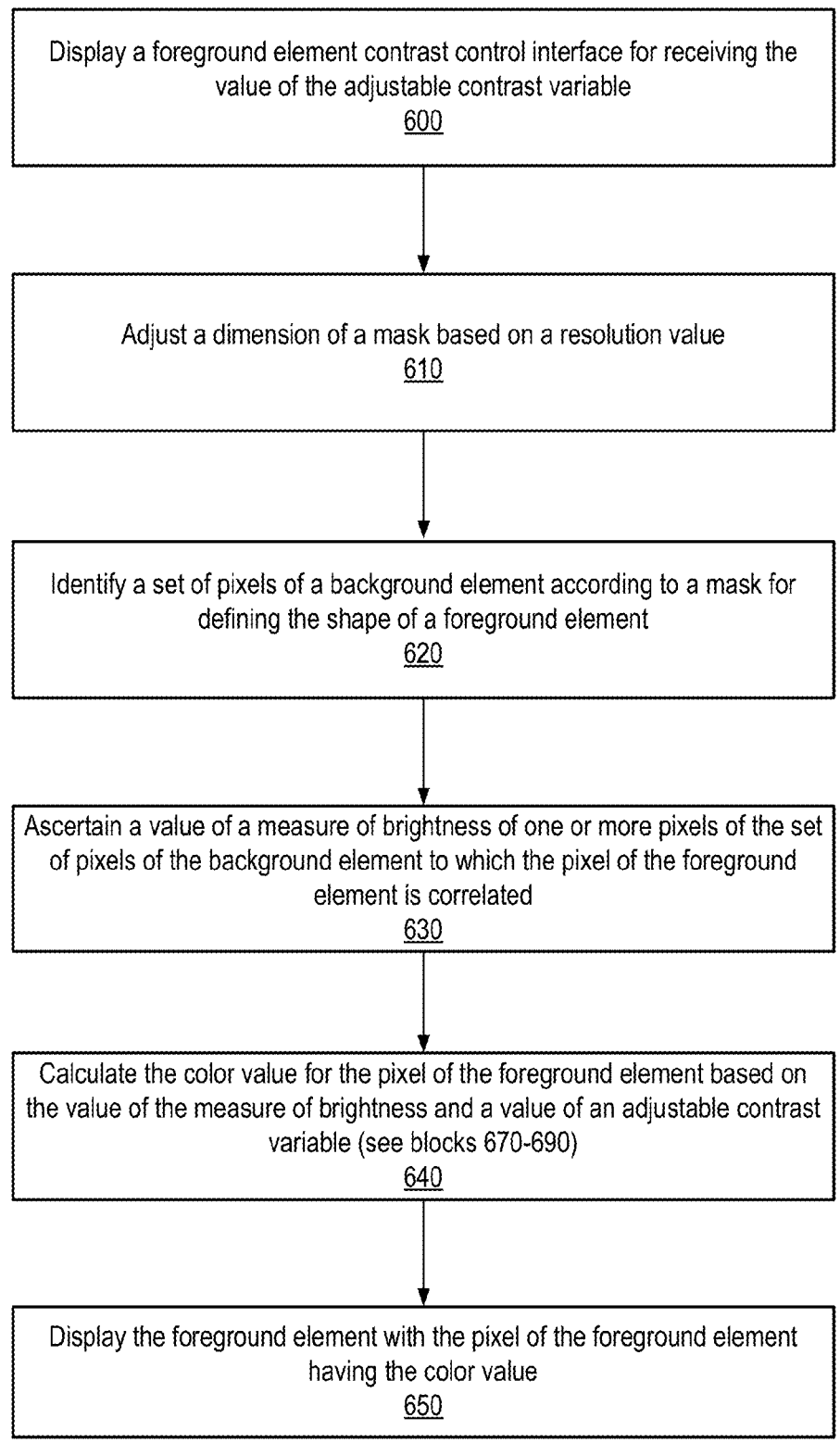
FIGS. 6A-6B depict high-level logical flowcharts of a process for improved display of foreground objects according to some embodiments.
Figure 6B:
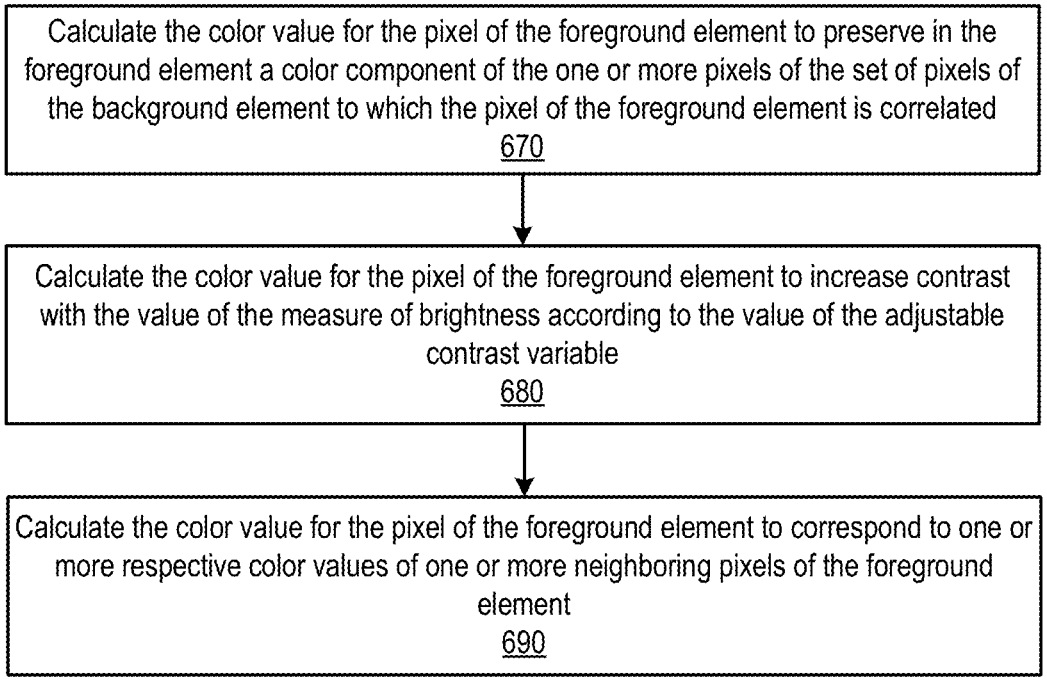

FIGS. 6A-6B depict high-level logical flowcharts of a process for improved display of foreground objects according to some embodiments. FIG. 6A depicts an overall process for display of foreground objects in blocks 600-550, while FIG. 6B illustrates detail of block 640. A foreground element contrast control interface is displayed for receiving the value of the adjustable contrast variable (block 600). A dimension of a mask is adjusted based on a resolution value (block 610). A set of pixels of a background element is identified according to a mask for defining the shape of a foreground element (block 620). A value of a measure of brightness of one or more pixels of the set of pixels of the background element to which the pixel of the foreground element is correlated is ascertained (block 630). The color value for the pixel of the foreground element based on the value of the measure of brightness and a value of an adjustable contrast variable is calculated (block 640). The foreground element is displayed with the pixel of the foreground element having the color value (block 650).

Turning now to FIG. 6B, the color value for the pixel of the foreground element to preserve in the foreground element a color component of the one or more pixels of the set of pixels of the background element to which the pixel of the foreground element is correlated is calculated (block 670). The color value for the pixel of the foreground element to increase contrast with the value of the measure of brightness according to the value of the adjustable contrast variable is calculated (block 680). The color value for the pixel of the foreground element to correspond to one or more respective color values of one or more neighboring pixels of the foreground element (block 690).

FIG. 7 illustrates a pixel group for use with a process for improved display of foreground objects according to some embodiments. Throughout the present disclosure, reference has been made to the concept of a "neighboring pixel," or a pixel in a neighborhood of a pixel of interest. In one embodiment a pixel of interest 700 is a pixel of a foreground object for which a value is being calculated. A set of neighboring pixels 710a-710h immediately surrounds the pixel of interest, as opposed to non-neighboring pixels 720a-720o. In alternative embodiments in which a foreground element is only a single pixel deep, it may be the case that the only neighboring pixels to be considered exist along a one-dimensional line, such as neighboring pixel 710b and neighboring pixel 710g for pixel of interest 700. Alternatively, this same one-dimensional example may be understood with respect to neighboring pixel 710d and neighboring pixel 710e for pixel of interest 700. In some embodiments, a set of neighboring pixels 710a-710h are pixels of a background element, while pixel of interest 700 is a pixel of a foreground element. Likewise, in some embodiments, both a set of neighboring pixels 710a-710h and pixel of interest 700 are pixels of a foreground element.

Figure 8:
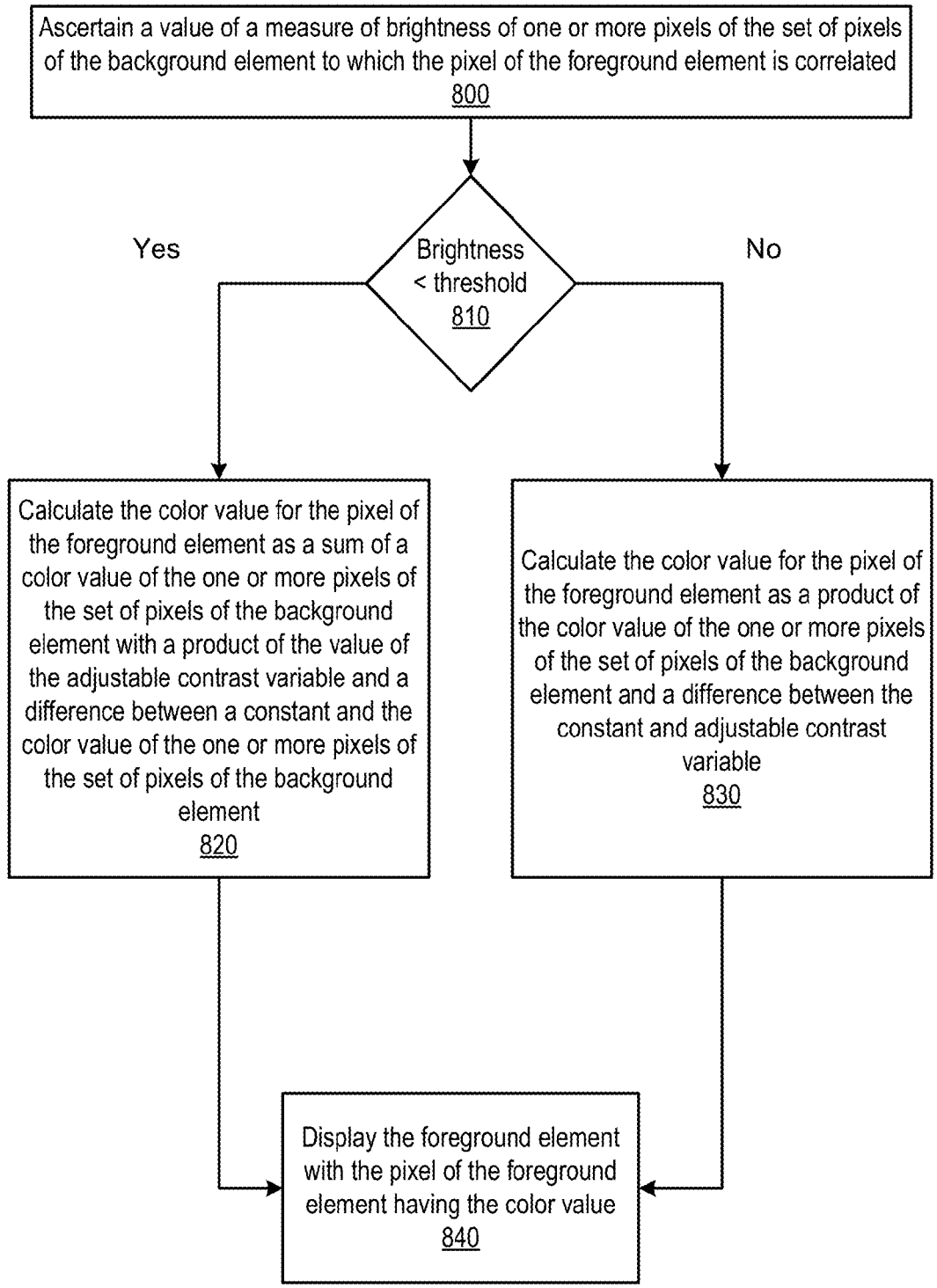
FIG. 8 depicts a high-level logical flowchart of a process for improved display of foreground objects according to some embodiments.
Figure 9:
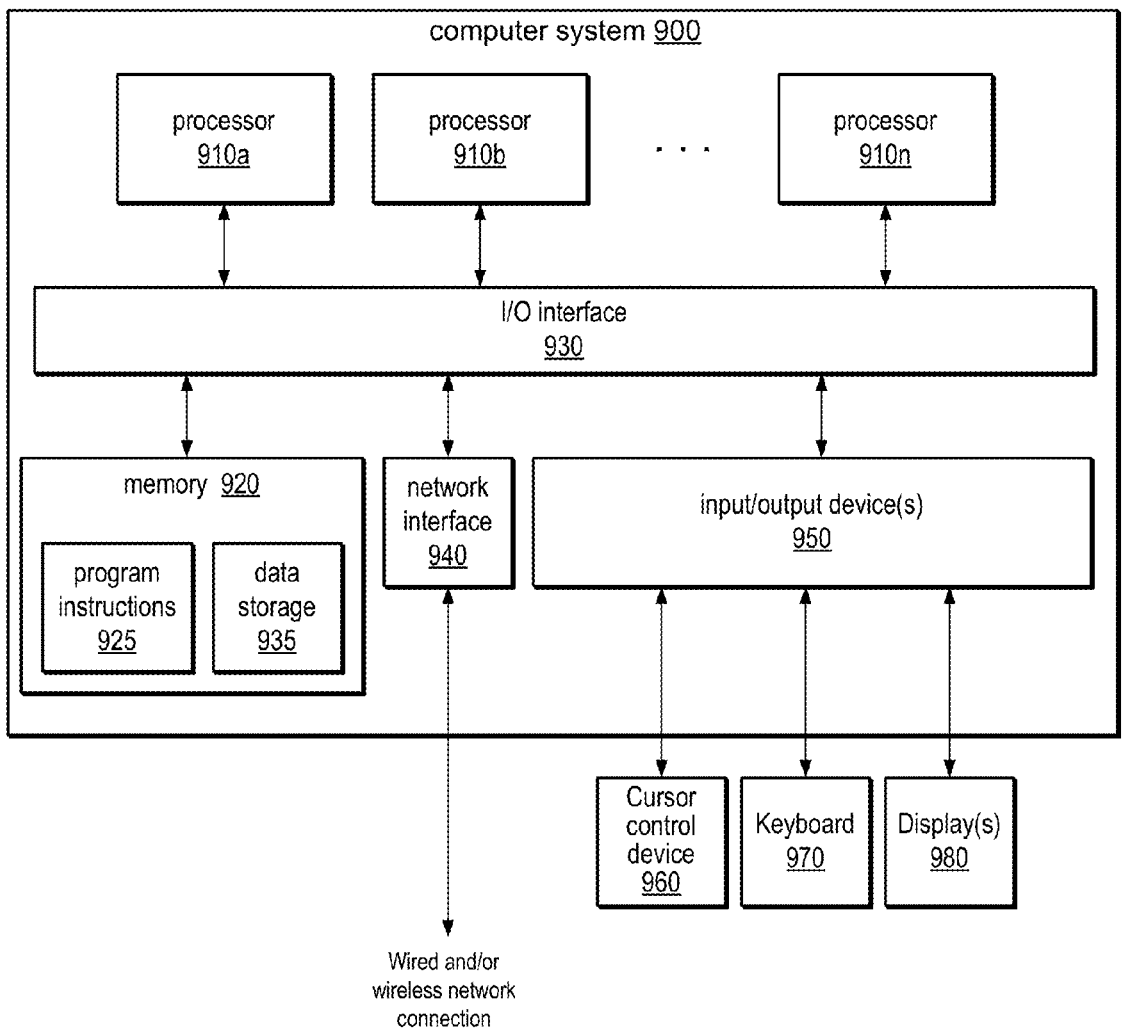
FIG. 9 illustrates an example computer system that may be used in embodiments.

FIG. 8 depicts a high-level logical flowchart of a process for improved display of foreground objects according to some embodiments. A value of a measure of brightness of one or more pixels of the set of pixels of the background element to which the pixel of the foreground element is correlated is ascertained (block 800). A determination is made as to whether the value of a measure of brightness is less than a threshold value (block 810).

If it is determined that the value of a measure of brightness is less than the threshold value, then the process proceeds to block 820. The color value for the pixel of the foreground element is calculated as a sum of a color value of the one or more pixels of the set of pixels of the background element with a product of the value of the adjustable contrast variable and a difference between a constant and the color value of the one or more pixels of the set of pixels of the background element (block 820). The foreground element is displayed with the pixel of the foreground element having the color value (block 840).

Returning to block 810, if it is determined that the value of a measure of brightness is not less than the threshold value, then the process proceeds to block 830. The color value for the pixel of the foreground element as a product of the color value of the one or more pixels of the set of pixels of the background element and a difference between the constant and adjustable contrast variable (block 830). The process then proceeds to block 840, which is described above.

Thus, in some embodiments, the algorithm for drawing a cursor over an image in a display pixel buffer may be stated as, for every image pixel under the cursor, first computing brightness component, sometimes referred to as a luminosity. For example, assume R, G and B values ranging from 0.0 to 1.0. User selectable contrast ranges from 0.0 to 1.0. Such a luminosity can be computed using an equation of the form luminosity=0.21×redImageComponent+0.71×greenImageComponent+0.08×blueImageComponent. In some embodiments, a requested contrast is received from a user. If the image pixel is dark (luminosity<0.5), then embodiments adjust the modified cursor output pixel using an equation of the form: outputPixel=imageColor+(1.0−imageColor)×requestedContrast—for each color channel (i.e., red, green and blue (RGB)). Otherwise if the image pixel is light (luminosity>=0.5 then embodiments adjust the modified cursor output pixel using an equation of the form: outputPixel=imageColor×(1.0−requestedContrast)—for each color channel (i.e., RGB).

Alternative embodiments will support color spaces other than the RGB color space implicitly assumed above. In alternative embodiments, an implementation for the LAB color space, a color component space with dimension L for lightness and a and b for the color-opponent dimensions may be stated as an algorithm of the form:

Assumptions: L, A, and B values range from 0.0 to 1.0
   User selectable Contrast ranges from 0.0 to 1.0
   Input color InL, InA, and InB are the pixel image color components under a pixel of the cursor
   OutL, OutA, and OutB are the output colors of the new cursor over the image

```
if ( InL < 0.5 )
{
    // image color needs to be lighter
    OutL = InL + (1.0 − InL) * Contrast;
    OutA = InA;
    OutB = InB;
}else
{
    // image color needs to be darker
    OutL = InL * (1− Contrast);
    OutA = InA;
    OutB = InB;
}
```

Example System

Embodiments of a foreground element calculation module and/or foreground element image preparation techniques as described herein may be executed on one or more computer systems, which may interact with various other devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 920 may be configured to store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a foreground element calculation module are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement embodiments of a foreground element calculation module as described herein, and data storage 935, comprising various data accessible by program instructions 925. In one embodiment, program instructions 925 may include software elements of embodiments of a foreground element calculation module as illustrated in the above Figures. Data storage 935 may include data that may be used in embodiments. In other embodiments, other or different software elements and data may be included.

Those skilled in the art will appreciate that computer system 900 is merely illustrative and is not intended to limit the scope of a foreground element calculation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, the method comprising:
   adjusting a dimension of a mask based on a resolution value, the mask defining a shape of a foreground element;
   identifying, using one or more processors, a set of pixels of a background element according to the mask;
   determining a color value for a pixel of the foreground element, wherein the determining comprises
      ascertaining a value of a measure of brightness of one or more pixels of the set of pixels of the background element to which the pixel of the foreground element is correlated, and
      calculating the color value for the pixel of the foreground element based on the value of the measure of brightness and a value of an adjustable contrast variable, wherein the calculating the color value for the pixel of the foreground element further comprises
         calculating the color value for the pixel of the foreground element to preserve in the foreground element a color component of the one or more pixels of the set of pixels of the background element to which the pixel of the foreground element is correlated, and
         calculating the color value for the pixel of the foreground element to increase contrast with the value of the measure of brightness according to the value of the adjustable contrast variable; and
   displaying the foreground element with the pixel of the foreground element having the color value.

2. The computer-implemented method of claim 1, wherein the calculating the color value for the pixel of the foreground element further comprises
   calculating the color value for the pixel of the foreground element to correspond to one or more respective color values of one or more neighboring pixels of the foreground element.

3. The computer-implemented method of claim 1, further comprising,
   displaying a foreground element contrast control interface for receiving the value of the adjustable contrast variable.

4. The computer-implemented method of claim 1, wherein the resolution value is a resolution value of a screen device displaying the background element.

5. The computer-implemented method of claim 1, wherein the resolution value is a resolution value of the background element.

6. The computer-implemented method of claim 1, wherein
   the pixel of the foreground element is correlated to a plurality of pixels of the set of pixels of the background element;
   the method further comprises calculating an aggregate color value of the plurality of pixels of the set of pixels of the background element; and
   the calculating the color value for the pixel of the foreground element based on the value of a measure of brightness and the value of the adjustable contrast variable further comprises calculating the color value for the pixel of the foreground element based on the aggregate color value.

7. A non-transitory computer-readable storage medium storing program instructions, wherein the program instructions are computer-executable to implement:
   adjusting a dimension of a mask based on a resolution value, the mask defining a shape of a foreground element;
   identifying, using one or more processors, a set of pixels of a background element according to the mask;
   determining a color value for a pixel of the foreground element, wherein the program instructions computer-executable to implement the determining comprise
      program instructions computer-executable to implement ascertaining a value of a measure of brightness of one or more pixels of the set of pixels of the background element to which the pixel of the foreground element is correlated, and
      program instructions computer-executable to implement calculating the color value for the pixel of the foreground element based on the value of the measure of brightness and a value of an adjustable contrast variable, wherein the program instructions computer-executable to implement calculating the color value for the pixel of the foreground element further comprise
         program instructions computer-executable to implement calculating the color value for the pixel of the foreground element to preserve in the foreground element a color component of the one or more pixels of the set of pixels of the background element to which the pixel of the foreground element is correlated, and
         program instructions computer-executable to implement calculating the color value for the pixel of the foreground element to increase contrast with the value of the measure of brightness according to the value of the adjustable contrast variable; and
   displaying the foreground element with the pixel of the foreground element having the color value.

8. The non-transitory computer-readable storage medium of claim 7, wherein:
the program instructions computer-executable to implement the calculating the color value for the pixel of the foreground element further comprise computer executable to implement calculating the color value for the pixel of the foreground element to correspond to one or more respective color values of one or more neighboring pixels of the foreground element.

9. The non-transitory computer-readable storage medium of claim 7, further comprising program instructions computer-executable to implement:
displaying a foreground element contrast control interface for receiving the value of the adjustable contrast variable.

10. The non-transitory computer-readable storage medium of claim 7, wherein
the pixel of the foreground element is correlated to a plurality of pixels of the set of pixels of the background element;
the program instructions are further computer-executable to implement calculating an aggregate color value of the plurality of pixels of the set of pixels of the background element; and
the program instructions computer executable to implement calculating the color value for the pixel of the foreground element based on the value of a measure of brightness and the value of the adjustable contrast variable are further computer executable to implement calculating the color value for the pixel of the foreground element based on the aggregate color value.

11. A system, comprising:
at least one processor; and
a memory comprising program instructions, wherein the program instructions are executable by the at least one processor to:
adjust a dimension of a mask based on a resolution value, the mask defining a shape of a foreground element;
identify a set of pixels of a background element according to the mask
determine a color value for a pixel of the foreground element, wherein the program instructions executable to determine the color value for the pixel of the foreground element comprise program instructions executable to
ascertain a value of a measure of brightness of one or more pixels of the set of pixels of the background element to which the pixel of the foreground element is correlated, and
calculate the color value for the pixel of the foreground element based on the value of the measure of brightness and a value of an adjustable contrast variable, wherein the program instructions executable to calculate the color value for the pixel of the foreground element comprise program instructions executable to
calculate the color value for the pixel of the foreground element to preserve in the foreground element a color component of the one or more pixels of the set of pixels of the background element to which the pixel of the foreground element is correlated, and
calculate the color value for the pixel of the foreground element to increase contrast with the value of the measure of brightness according to the value of the adjustable contrast variable; and
display the foreground element with the pixel of the foreground element having the color value.

12. The system of claim 11, wherein the program instructions executable by the at least one processor to calculate the color value for the pixel of the foreground element further comprise program instructions executable by the at least one processor to calculate the color value for the pixel of the foreground element to correspond to one or more respective color values of one or more neighboring pixels of the foreground element.

13. The system of claim 11, further comprising program instructions executable by the at least one processor to
display a foreground element contrast control interface for receiving the value of the adjustable contrast variable.

14. The system of claim 11, wherein the resolution value is a resolution value of a screen device displaying the background element.

15. A computer-implemented method, the method comprising:
identifying, using one or more processors, a set of pixels of a background element according to a mask, wherein the mask defines a shape of a foreground element;
determining a color value for a pixel of the foreground element, wherein the determining comprises
ascertaining a value of a measure of brightness of one or more pixels of the set of pixels of the background element to which the pixel of the foreground element is correlated, and
calculating the color value for the pixel of the foreground element based on the value of the measure of brightness and a value of an adjustable contrast variable, wherein the calculating the color value for the pixel of the foreground element further comprises
calculating the color value for the pixel of the foreground element to preserve in the foreground element a color component of the one or more pixels of the set of pixels of the background element to which the pixel of the foreground element is correlated,
calculating the color value for the pixel of the foreground element to increase contrast with the value of the measure of brightness according to the value of the adjustable contrast variable,
if the value of a measure of brightness is less than a threshold value, calculating the color value for the pixel of the foreground element as a sum of a color value of the one or more pixels of the set of pixels of the background element with a product of the value of the adjustable contrast variable and a difference between a constant and the color value of the one or more pixels of the set of pixels of the background element, and
if the value of a measure of brightness is greater than the threshold value, calculating the color value for the pixel of the foreground element as a product of the color value of the one or more pixels of the set of pixels of the background element and a difference between the constant and adjustable contrast variable; and
displaying the foreground element with the pixel of the foreground element having the color value.

16. A non-transitory computer-readable storage medium storing program instructions, wherein the program instructions are computer-executable to implement:
identifying, using one or more processors, a set of pixels of a background element according to a mask, wherein the mask defines a shape of a foreground element;

determining a color value for a pixel of the foreground element, wherein the program instructions computer-executable to implement the determining comprise
program instructions computer-executable to implement ascertaining a value of a measure of brightness of one or more pixels of the set of pixels of the background element to which the pixel of the foreground element is correlated, and
program instructions computer-executable to implement calculating the color value for the pixel of the foreground element based on the value of the measure of brightness and a value of an adjustable contrast variable, wherein the program instructions computer-executable to implement calculating the color value for the pixel of the foreground element further comprise
program instructions computer-executable to implement calculating the color value for the pixel of the foreground element to preserve in the foreground element a color component of the one or more pixels of the set of pixels of the background element to which the pixel of the foreground element is correlated,
program instructions computer-executable to implement calculating the color value for the pixel of the foreground element to increase contrast with the value of the measure of brightness according to the value of the adjustable contrast variable,
program instructions computer-executable to implement if the value of a measure of brightness is less than a threshold value, calculating the color value for the pixel of the foreground element as a sum of a color value of the one or more pixels of the set of pixels of the background element with a product of the value of the adjustable contrast variable and a difference between a constant and the color value of the one or more pixels of the set of pixels of the background element, and
program instructions computer-executable to implement if the value of a measure of brightness is greater than the threshold value, calculating the color value for the pixel of the foreground element as a product of the color value of the one or more pixels of the set of pixels of the background element and a difference between the constant and adjustable contrast variable; and
displaying the foreground element with the pixel of the foreground element having the color value.

* * * * *